Feb. 4, 1958 L. A. RIVOLTA 2,822,214
INTERCONNECTED VEHICLE FRONT DOOR AND STEERING
WHEEL FOR EASY ACCESS TO SEATS
Filed March 4, 1953 2 Sheets-Sheet 1

INVENTOR.
Lorenzo Amilcare Rivolta
BY Michael S. Striker
agt

Feb. 4, 1958            L. A. RIVOLTA            2,822,214
INTERCONNECTED VEHICLE FRONT DOOR AND STEERING
WHEEL FOR EASY ACCESS TO SEATS

Filed March 4, 1953            2 Sheets-Sheet 2

INVENTOR.

BY Lorenzo Amilcare Rivolta

United States Patent Office 2,822,214
Patented Feb. 4, 1958

2,822,214

INTERCONNECTED VEHICLE FRONT DOOR AND STEERING WHEEL FOR EASY ACCESS TO SEATS

Lorenzo Amilcare Rivolta, Bresso, Italy

Application March 4, 1953, Serial No. 340,296

Claims priority, application Italy December 31, 1952

1 Claim. (Cl. 296—44)

This invention relates to a motor car with front door.

The motor car according to the invention is substantially characterized by the provision of a front door, that allows access directly to the seats. Moreover, according to a preferred embodiment of the invention, the steering column tube is supported by the front door, whereby each time that same door is swung open, the steering wheel will be brought away from the seats, thus making more easy for the driver and passenger to get into, or out of the car. The steering column, whereon the steering wheel is rigidly secured, is supported by the front door through at least one rigid arm, and is connected at its lower end with the shaft of steering gear by means of a cardan or universal joint.

The further objects and advantages of the invention will be better appreciated from a consideration of the following description of a preferred embodiment thereof, taken with the accompanying drawings, both description and drawings not being given as a restrictive example of the scope of this invention.

Figure 1:
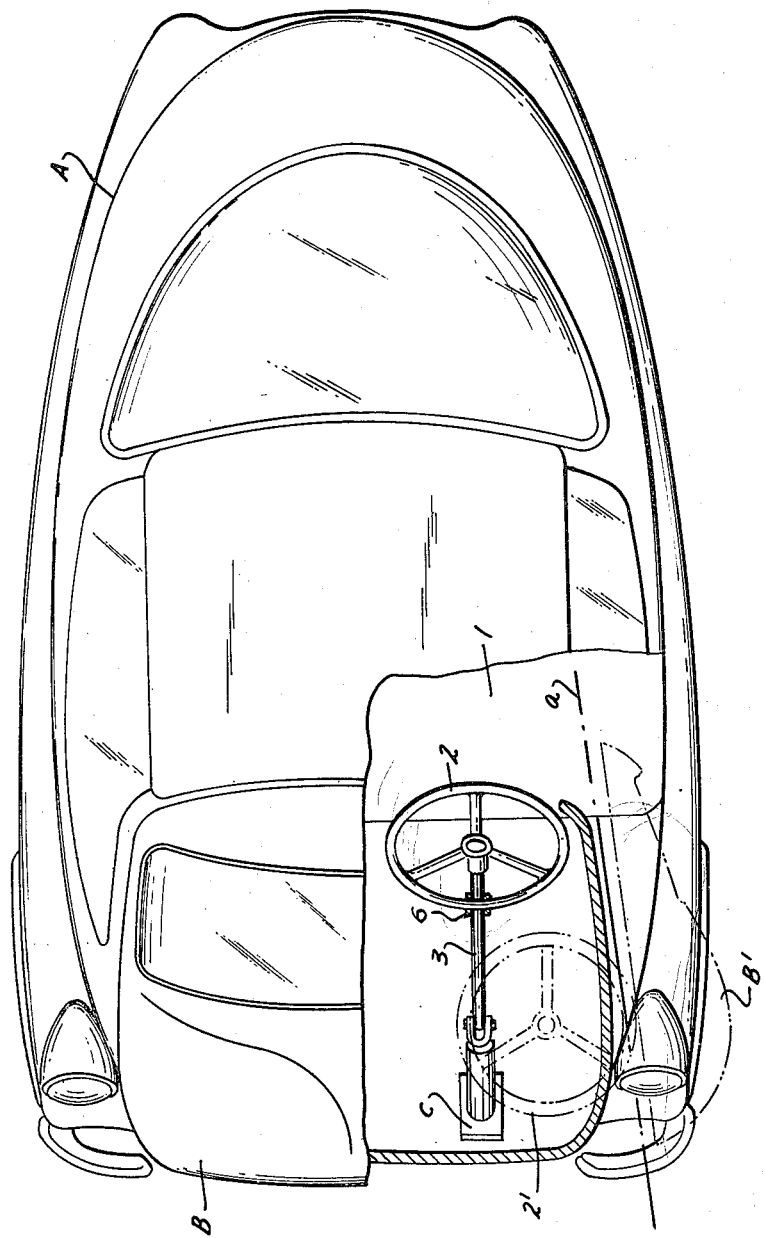
Fig. 1 is a plan view, partly in section, of a motor car according to the invention.
Figure 2:
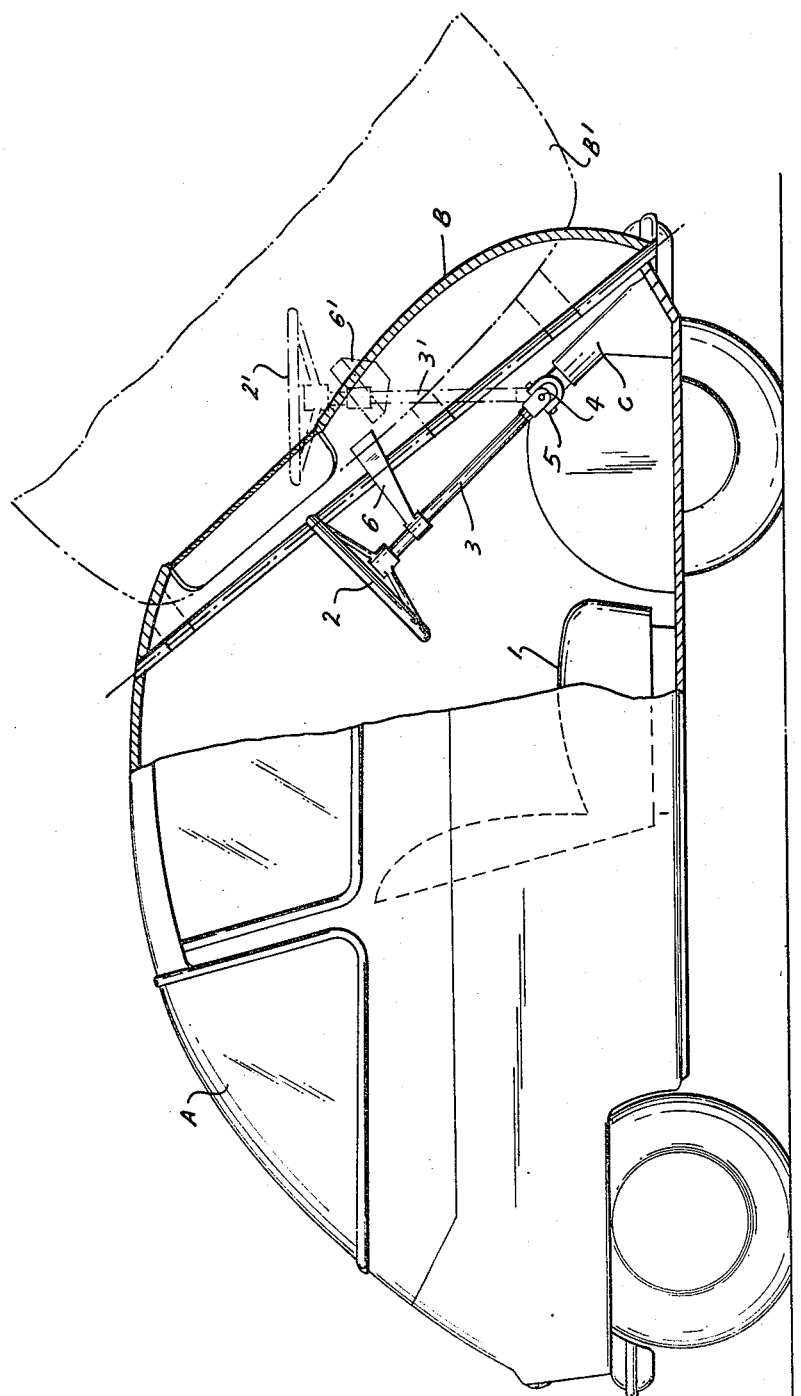
Fig. 2 is a side elevation, partly in section, of same car.

Referring now to the above said figures, A is the car (as a two-seater, four-wheel type) with a front door B, hinged on one side in such a manner that its swinging axis $a$ is inclined upwardly and rearwardly. The free passage area left after the door has been swung open around said rearward inclined swinging axis $a$, is such as to allow the driver or passenger to get up, or to sit down without the necessity of bowing or moving toward the fore part of car. At 1 are the two seats of the car.

The steering wheel 2 is rigidly secured to steering column 3, connected at its lower end with the shaft 4 of steering mechanism C. The steering column tube is supported by the front door B through the rigid arm 6.

When the door B is swung open and brought in the position B' as shown with dotted lines in the drawings, the steering column 3, with its steering wheel 2, will follow the movement of said door—as it is mounted to swivel freely around the center of cardan joint 5—thus attaining the position marked with 3'—2' in the accompanying drawings.

The steering column is mounted to take any position in respect to the center of cardan joint 5 and, as already stated, use is made of such a possibility to move the steering wheel in a forward and sidewise direction.

Thus, with the steering wheel cleared out of way in the aforestated manner, the driver or passenger are allowed to pass through the door in a much more easy manner.

It is to be understood that the invention is not limited to the exact details of construction shown and described, as variations and modifications and changes may be made therein as fall within the scope of the claim hereunto.

What it is claimed is:

In a motor car, in combination, an upright steering column means including a rigid lower portion fixedly secured to the motor car, a rigid upper portion, and universal joint-means connecting said upper and lower portions of said steering column means; a door means hingedly connected to the motor car for pivotal movement about an upright axis extending substantially parallel to said steering column means and being movable between a closed position and an open position; and a supporting means connecting said door means and said upper portion of the steering column means in such manner that said upper portion of the steering column means turns about said universal joint means and assumes a position angularly displaced with respect to said lower portion of said steering column means and permitting easy access through said door means when said door means are moved to said open position.

References Cited in the file of this patent

UNITED STATES PATENTS

| 743,013 | Mott | Nov. 3, 1903 |
| 2,267,509 | Strong | Dec. 23, 1941 |

FOREIGN PATENTS

| 747,183 | France | Mar. 21, 1933 |
| 809,482 | France | Dec. 12, 1936 |
| 851,910 | France | Oct. 16, 1939 |
| 400,467 | Great Britain | Oct. 26, 1933 |